UNITED STATES PATENT OFFICE.

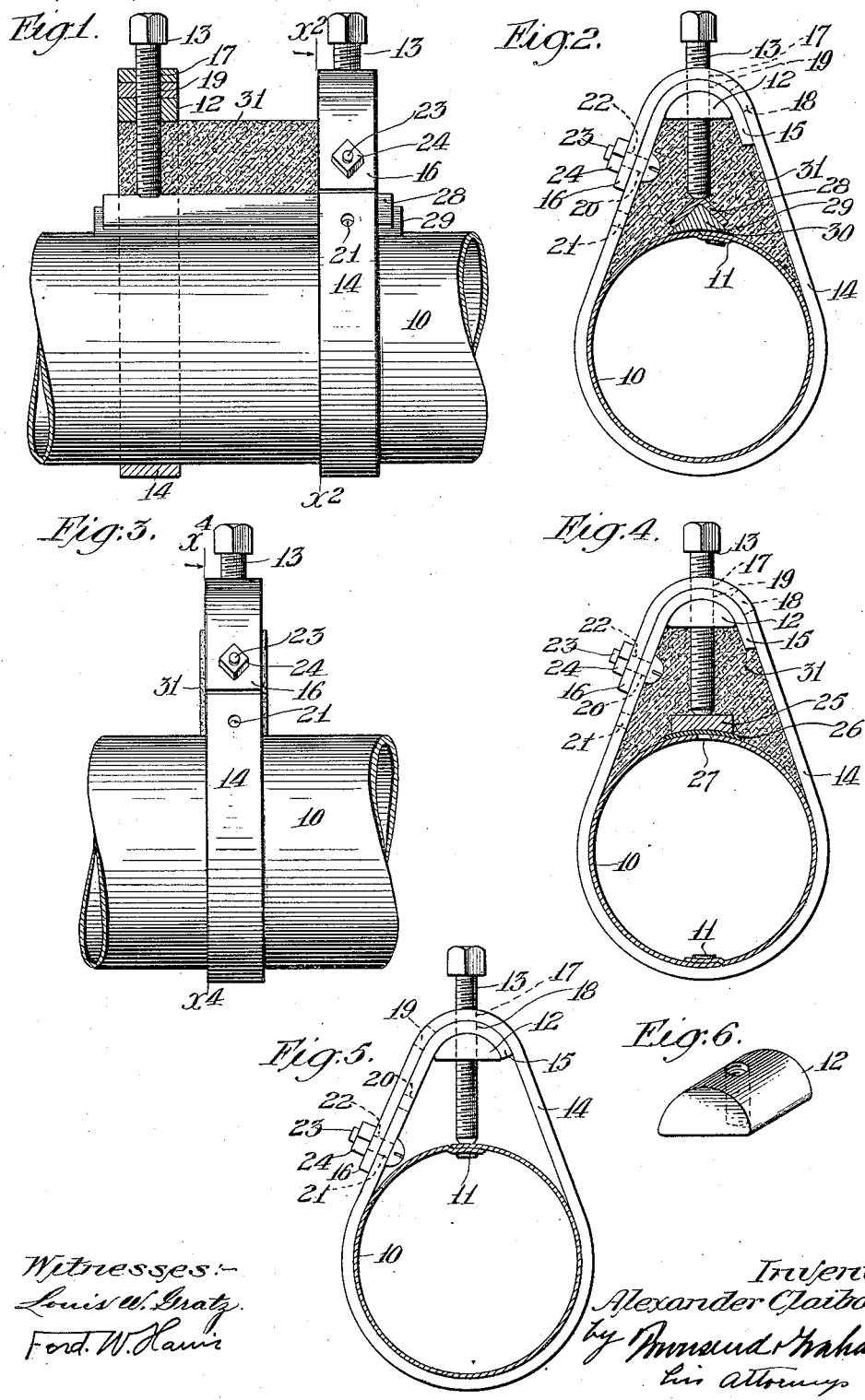

ALEXANDER CLAIBORNE, OF PALMS, CALIFORNIA, ASSIGNOR TO WESTERN PIPE & STEEL COMPANY OF CALIFORNIA, OF LOS ANGELES, CALIFORNIA, A CORPORATION OF CALIFORNIA.

PIPE-REPAIRING DEVICE.

1,154,376.  Specification of Letters Patent.  Patented Sept. 21, 1915.

Application filed April 4, 1914.  Serial No. 829,704.

*To all whom it may concern:*

Be it known that I, ALEXANDER CLAIBORNE, a citizen of the United States, residing at Palms, in the county of Los Angeles and State of California, have invented a new and useful Pipe-Repairing Device, of which the following is a specification.

My invention relates to pipe repairing devices such as are employed for stopping leaks in piping and particularly in riveted piping such as is commonly used to carry water for irrigation and similar purposes.

The principal object of my invention is to provide leak stopping means that can be easily adjusted to different diameters of pipes and which may be used in various combinations to meet different conditions.

A further object is to provide leak stopping means which can be placed on a pipe to close a leak without shutting off the water flowing through such pipe and which will effectually and permanently stop such leaks.

Further objects and advantages will be apparent from the following specification and from the drawing submitted herewith for illustrative purposes.

In the drawing, Figure 1 is an elevation partly in section of one method of applying the invention to a leaky seam or a longitudinal crack in the pipe. Fig. 2 is a section on the plane $x^2$—$x^2$ of Fig. 1. Fig. 3 is an elevation of the invention as applied to a small hole in the pipe. Fig. 4 is a section on the plane $x^4$—$x^4$ of Fig. 3. Fig. 5 is an elevation showing another method of applying the invention to stop such a hole. Fig. 6 is a perspective view of an element of my invention.

In the drawing, 10 is a riveted pipe having a seam at 11.

12 is a nut having a curved upper surface and a threaded hole through which a screw 13 passes.

A flat strap 14, preferably of metal, passes around the pipe 10 and the ends 15 and 16 are overlapped, as shown, the end 15 being bent to fit the nut, and the end 16 being bent to overlap the end 15. Holes 17 and 18 are drilled in the end 16 and a hole 19 is drilled in the end 15, the holes 17, 18, and 19 being slightly larger than the screw 13. A pair of holes 20 and 21 in the end 15 and a hole 22 in the end 16 are of sufficient size to receive a bolt 23 having a nut 24, the holes 20 and 22 registering when the screw 13 is in the holes 17 and 19, and the holes 21 and 22 registering when the screw 13 is in the holes 18 and 19. This allows the virtual length of the strap 14 to be adjusted and additional holes may be drilled for further adjustment if desired.

The strap 14 being placed about the pipe 10, the nut 12 is put in place and the screw 13 is forced down upon the leak. The upper curved surface of the nut 12 provides an even bearing for the strap 14. The ends of the nut 12 are flat and the same width as the strap so that the nut can be held firmly with one wrench at the same time that the screw 13 is turned with another wrench. In the case of leaky seams it is often sufficient to allow the end of the screw 13 to rest directly on the seam 11 approximately as shown in Fig. 5. The seam 11 may then be calked with a calking chisel, a sufficient number of straps 14 being used to handle the entire length of the leaky seam. In other cases where a pin hole has developed in a pipe a washer 25 and a plastic filler 26 may be placed over the leak 27 as illustrated in Fig. 4. In cases of a long leak, either on a seam or elsewhere, it is often advisable to use an angle iron 28, a wood filler 29 and a plastic filler 30 with a plurality of straps 14 as illustrated in Figs. 1 and 2. Wherever used the parts may be restrained and the leak further sealed by a body of cement 31 filled in around the screw 13 under the strap 14 as illustrated.

I claim:

A pipe repairing device comprising a strap adapted to encircle the pipe and having its ends overlapped and secured together, a nut inside said strap, a screw threaded in said nut and passing through both ends of said strap, a filler block adapted to fit over said leak being restrained by said screw, and a metal angle iron member between said screw and said filler block.

In testimony whereof, I have hereunto set my hand at Los Angeles, California, this 16th day of March, 1914.

ALEXANDER CLAIBORNE.

In presence of—
 FORD W. HARRIS,
 FRED A. MANSFIELD.